United States Patent [19]
Zerrer et al.

[11] Patent Number: 4,696,108
[45] Date of Patent: Sep. 29, 1987

[54] PRUNING APPARATUS

[75] Inventors: Gerhard Zerrer, Korb; Günter Mayer, Untereisesheim, both of Fed. Rep. of Germany

[73] Assignee: Andreas Stihl, Waiblingen, Fed. Rep. of Germany

[21] Appl. No.: 743,512

[22] Filed: Jun. 11, 1985

[30] Foreign Application Priority Data

Jun. 14, 1984 [DE] Fed. Rep. of Germany ....... 3421999

[51] Int. Cl.$^4$ ................................ B26B 7/00
[52] U.S. Cl. ..................... 30/276; 30/296 R
[58] Field of Search ............. 30/240, 276, 296 R, 30/390

[56] References Cited

U.S. PATENT DOCUMENTS

| | | | |
|---|---|---|---|
| 2,539,619 | 1/1951 | Goodall | 30/276 X |
| 3,050,854 | 8/1962 | Becker et al. | 30/276 |
| 3,219,129 | 11/1965 | Yamada | 30/296 R X |
| 3,959,879 | 6/1976 | Sellers | 30/276 |
| 4,286,675 | 9/1981 | Tuggle | 30/276 X |
| 4,505,040 | 3/1985 | Everts | 30/296 R |

FOREIGN PATENT DOCUMENTS 659682 5/1938 Fed. Rep. of Germany ........ 30/276

Primary Examiner—E. R. Kazenske
Assistant Examiner—Michael D. Folkerts
Attorney, Agent, or Firm—Walter Ottesen

[57] ABSTRACT

The invention is directed to a pruning apparatus having a drive motor which is mounted on a carrier adapted for mounting on the back of an operator. The drive motor is connected with a rotating cutting tool by means of a flexible shaft. The flexible shaft includes an output member and a drive member. The output member is connected to a drive motor and is contained in a connecting tube. The output member is connected via a coupling unit to the drive member which is disposed in a guide tube. The guide tube carries the rotating cutting tool which produces a smooth cut so that the formation of fungus at the cut is completely eliminated. A cover plate is affixed to the guide tube so as to be adjacent to the cutting tool and has an outer diameter smaller than the cutting circle defined by the tip of the rotating cutting tool. While operating the apparatus, the stationary cover plate, unlike the rotating cutting tool, remains clearly visible thereby facilitating a precise cutting operation.

4 Claims, 8 Drawing Figures

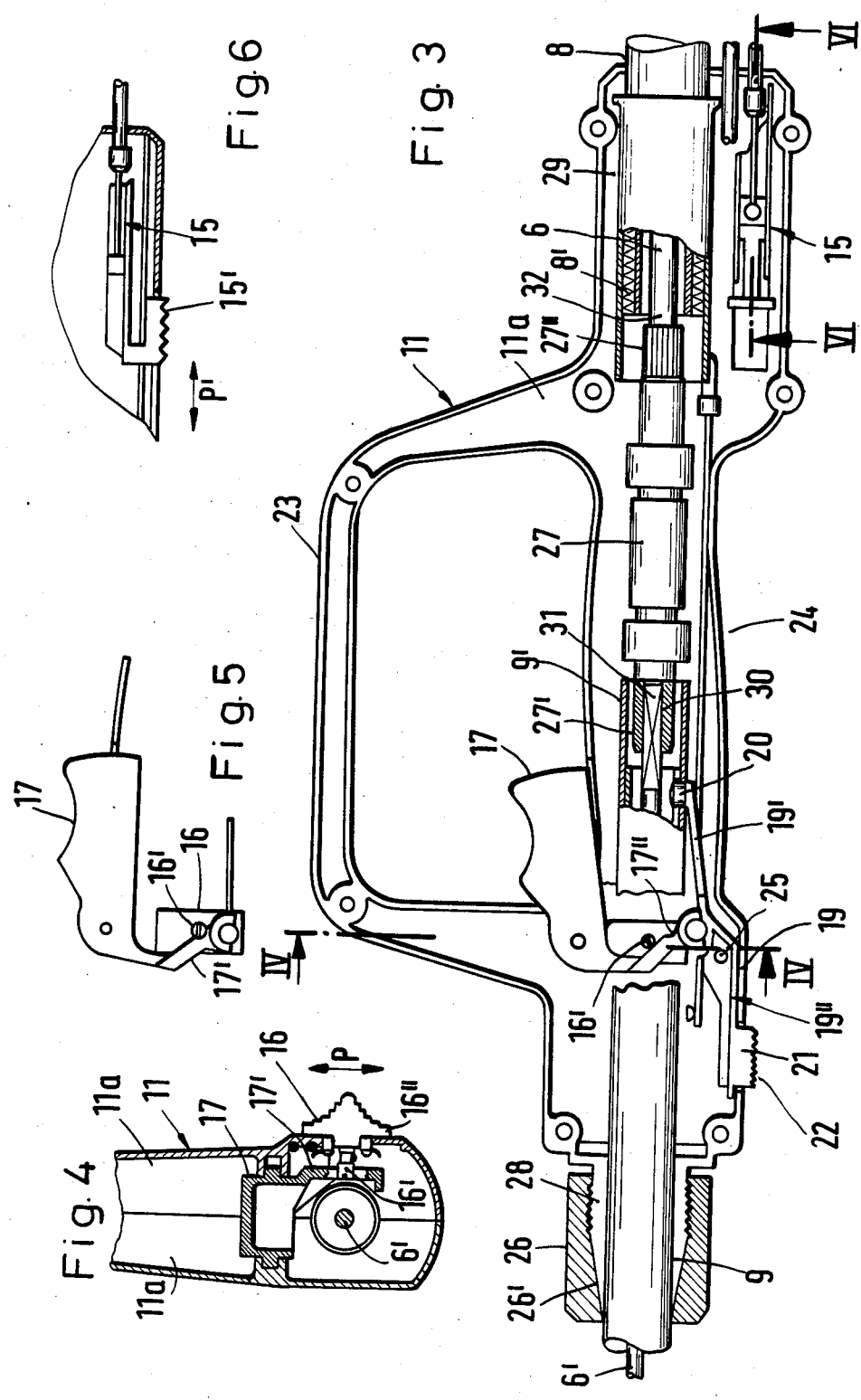

PRUNING APPARATUS

FIELD OF THE INVENTION

The invention relates to a portable motor-driven pruning apparatus for cutting vegetation such as vines and the like. The pruning apparatus has a drive motor mounted on a carrier and has at least one cutting tool which is connected with the drive motor by means of a drive member preferably in the form of a flexible shaft. At least one handle is connected to the drive motor with a connecting part and is detachably joined to a guide tube for accomodating the cutting tool at the other end thereof.

BACKGROUND OF THE INVENTION

Pruning apparatus of the kind described above are used for cutting grapes from vines in vineyards. Vine shoots extend over the entire length of the vine and sap nourishment for the fruit at the ends of the vine. The pruning of excess foliage is mandatory for achieving optimum growth. The reach of conventional pruning apparatus is relatively limited, so that the top shoots on high vines can only be reached with great difficulty, or not at all.

Conventional pruning apparatus employ hedge clipper type cutting tools which have two blades working in opposite directions. The cutting of shoots with such tools does not provide a smooth cut and the rather rough cuts that result may become breeding ground for fungi and even cause infestation of the vines with fungus diseases. Another drawback of conventional pruning apparatus is that shoots cut off from the upper vines get caught on the vines themselves and remain there to rot thereby again leading to fungus infestation and diminished growth of the vines. Moreover, the hedge clipper at the free end of the guide tube is relatively heavy so that the handling of the device is substantially impaired when pruning vines that are far removed or otherwise are hard to reach.

SUMMARY OF THE INVENTION

It is an object of the invention to provide a motor-driven pruning apparatus which affords easy and safe handling. It is another object of the invention to provide a motor-driven pruning apparatus which is of uncomplicated and light-weight configuration and which permits smooth cutting of vine foliage so that formation of fungus at the cuts, and rot of the severed shoots is avoided.

The cutting blade of the pruning apparatus of the invention provides clean cuts and thus eliminates fungus formation at the smoothly cut surfaces of the shoots. Because of the high rotary speeds of the cutting blade, the shoots are subjected to a strong shock impact during the cutting process which causes them to be flung away from the cutting area. The shoots are propelled by their inherent kinetic energy and drop to the ground. This procedure prevents cut shoots from remaining and rotting on the vine itself and the fungus infestation which would otherwise follow. As the cutting blade only rotates, a drive of less weight can be utilized than present in conventional devices having a hedge clipper type cutter.

The cover part of the apparatus which is provided according to a feature of the invention serves as an orientation guide for cutting shoots which are far removed or shoots whose visibility or access is otherwise impaired. As the cover, unlike the cutting blade, remains stationary during the cutting process, the operator can clearly see the edge of the cover and accurately guide the blade to the shoot to be cut without interfering with the support wires which are commonly used in vine cultivation. Consequently, work can be performed in a time-effective and uncomplicated manner, with utmost safety.

The light cutting blade and the guide tube, which also may be of light weight, could easily be damaged when using the pruning apparatus of the invention for cutting vegetation heavier than vine shoots. A first safety arrangement is provided which limits the transmitted torque, and inherently the cutting power, as a safeguard against such an occurrence. A second safety arrangement serves to prevent the risk of damage to the cutting blade and, moreover, the risk of injury to the operator which might occur during start-up of the apparatus while placed on the ground.

BRIEF DESCRIPTION OF THE DRAWING

The invention will now be described in more detail with reference to the accompanying drawing wherein:

FIG. 3 is an enlarged view taken vertically through the clam-shell housing of the grip handle of the pruning apparatus of FIG. 1 and shows the handle having two end portions connected to a flexible connecting tube and a guide tube, respectively;

FIG. 4 is a vertical section view taken along line IV—IV of FIG. 3;

FIG. 5 illustrates a gas lever pivotally mounted in the grip handle and in the unlatched position;

FIG. 6 is a section view taken along line VI—VI of FIG. 3;

DESCRIPTION OF THE PREFERRED EMBODIMENTS OF THE INVENTION

Figure 1:
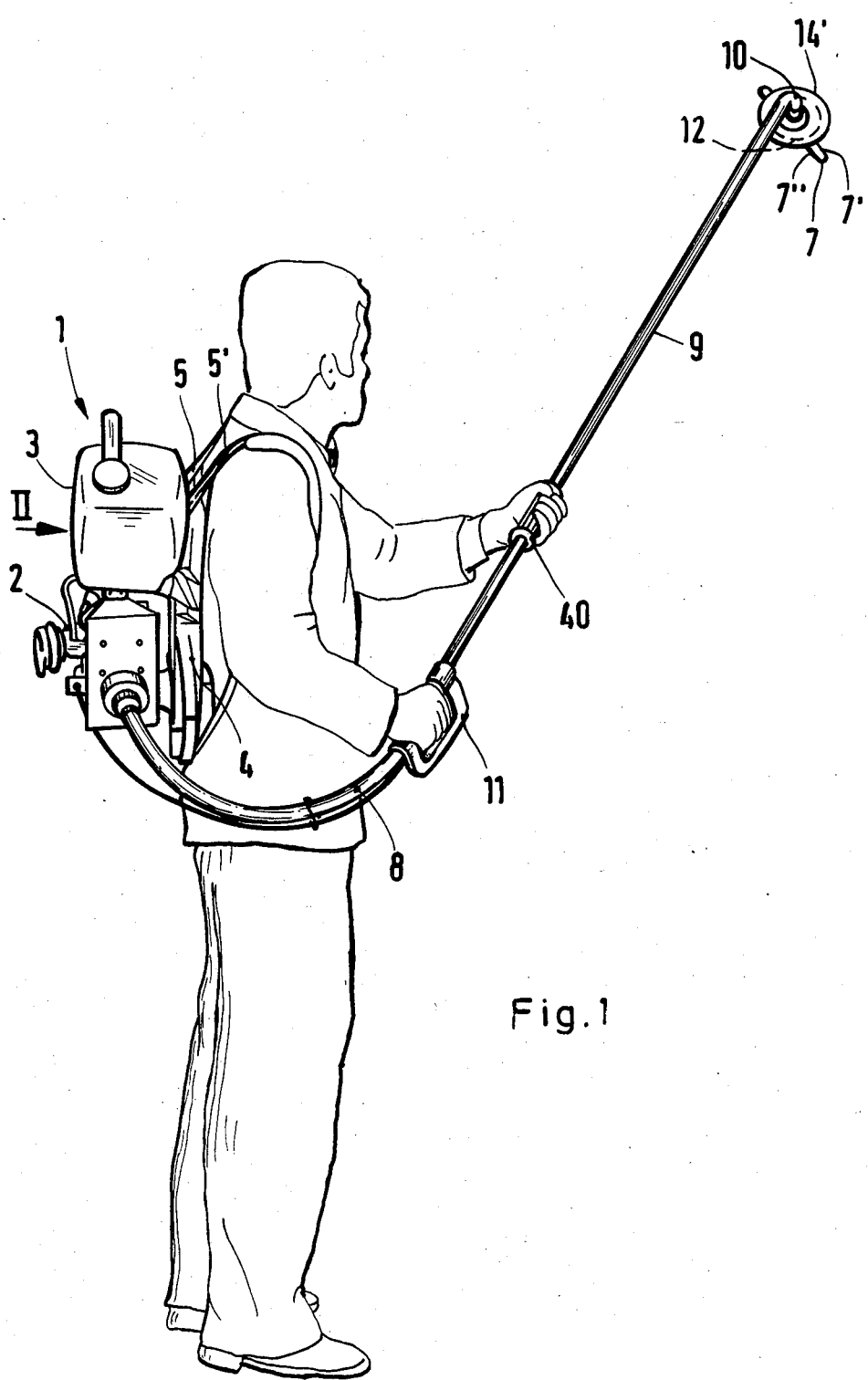
FIG. 1 is a perspective view of the pruning apparatus of the invention showing how the drive motor and carrier are carried on the back of an operator and the guide tube with the cutting assembly are held in the operating position.
Figure 2:
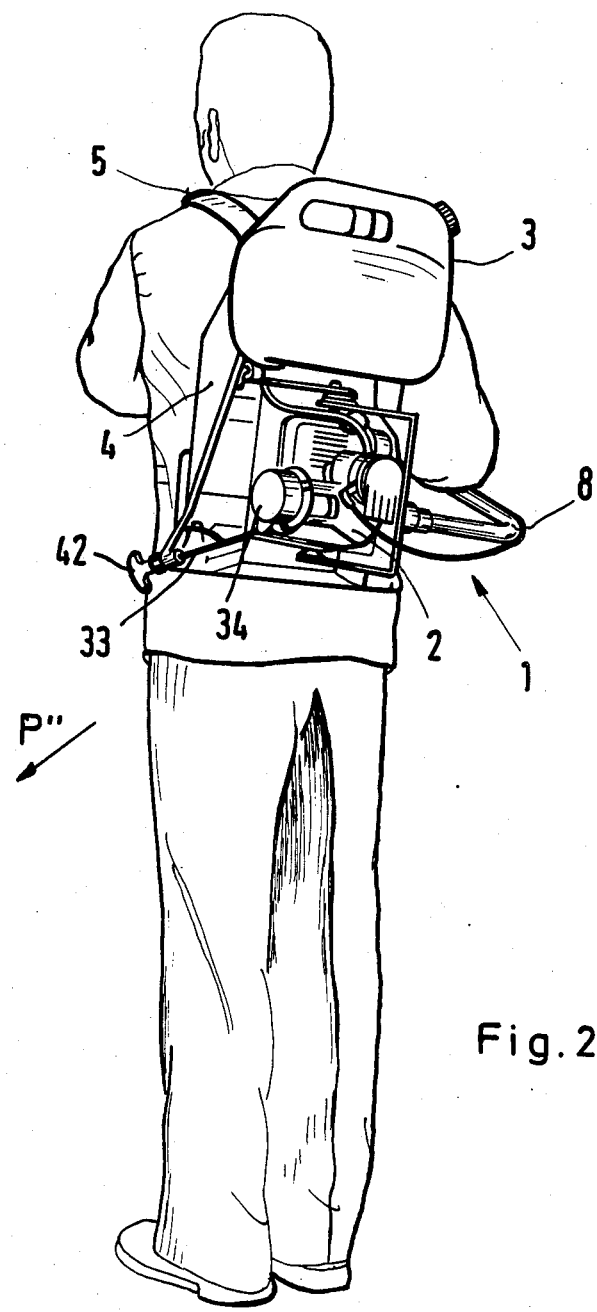
FIG. 2 illustrates a view in direction of arrow II of FIG. 1.

The vine pruning apparatus 1 of FIGS. 1 and 2 has a drive motor 2 which is preferably in the form of an internal combustion engine equipped with a tank 3 mounted on carrier plate 4. Carrying straps 5, 5' are attached with eyelets to a suspension device at carrier plate 4. The straps 5, 5' retain the carrier plate with motor 2 and tank 3 on the back of the operator.

Drive motor 2 is connected with cutting tool 7 (FIG. 1) by torque transmitting means configured as a flexible shaft 6, 6' (FIG. 3). To protect flexible shaft 6, 6', drive motor 2 is mounted on the carrier plate 4 with elastic bearings so as to be pivotable about a vertical axis. The elastic bearings simultaneously serve to insulate the carrier plate and the operator from the unavoidable vibrations of the engine. Flexible shaft 6, 6' includes an output member 6 and a drive member 6' which is detachably connected to the latter. The members 6 and 6' are housed in a flexible connecting tube 8 and a rigid guide tube 9, respectively (see also FIGS. 1 and 2). Output member 6 and drive member 6' are coupled to rotate together by means of a coupling element 27 mounted in the carrying handle 11 of pruning apparatus 1. Output member 6 and tube 8 are connected to drive motor 2; whereas, cutting tool 7 is journalled at free end 10 of guide tube 9. The free end 10 includes a portion defining a bend of approximately ninety degrees.

The cutting tool is an elongated two-armed knife blade which rotates about a center axis and is preferably made of steel. Its longitudinal edges 7', 7" are both cutting edges. Accordingly, when the cutting edges facing in rotational direction are worn, the cutting tool can be turned over 180° thereby utilizing the cutting edges which were previously facing away from the direction of rotation. Cutting blade 7 operates at high rotary speed and because the blade 7 only rotates, it is easily powered. The high rotary speed affords the advantage that the vine shoots which are cut during the cutting process have a clean cut surface and receive a strong shock impact which flings them far away from the cutting area and onto the ground. This action prevents the cut shoots from catching on the upper end of the vines. By eliminating rough cuts and subsequent rotting of the cut shoots on the vines, fungus infestation of the vine is avoided which would otherwise impair its growth and affect the formation of grapes.

Figure 7:
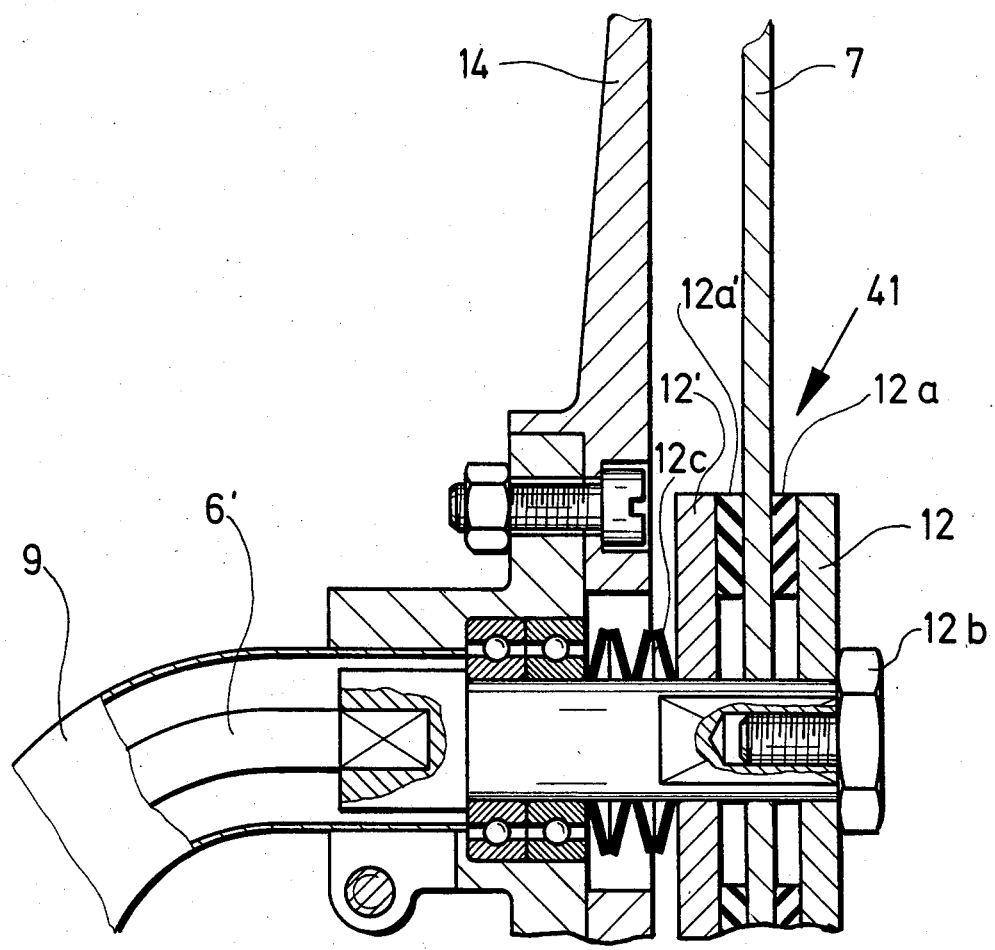
FIG. 7 is a view of the cutting blade assembly mounted on the outer end of the guide tube and incorporating a slip coupling; and, FIG. 8 is a plan view of a cover plate mounted at the outer end of the guide tube and having a toothed peripheral edge.
Figure 8:
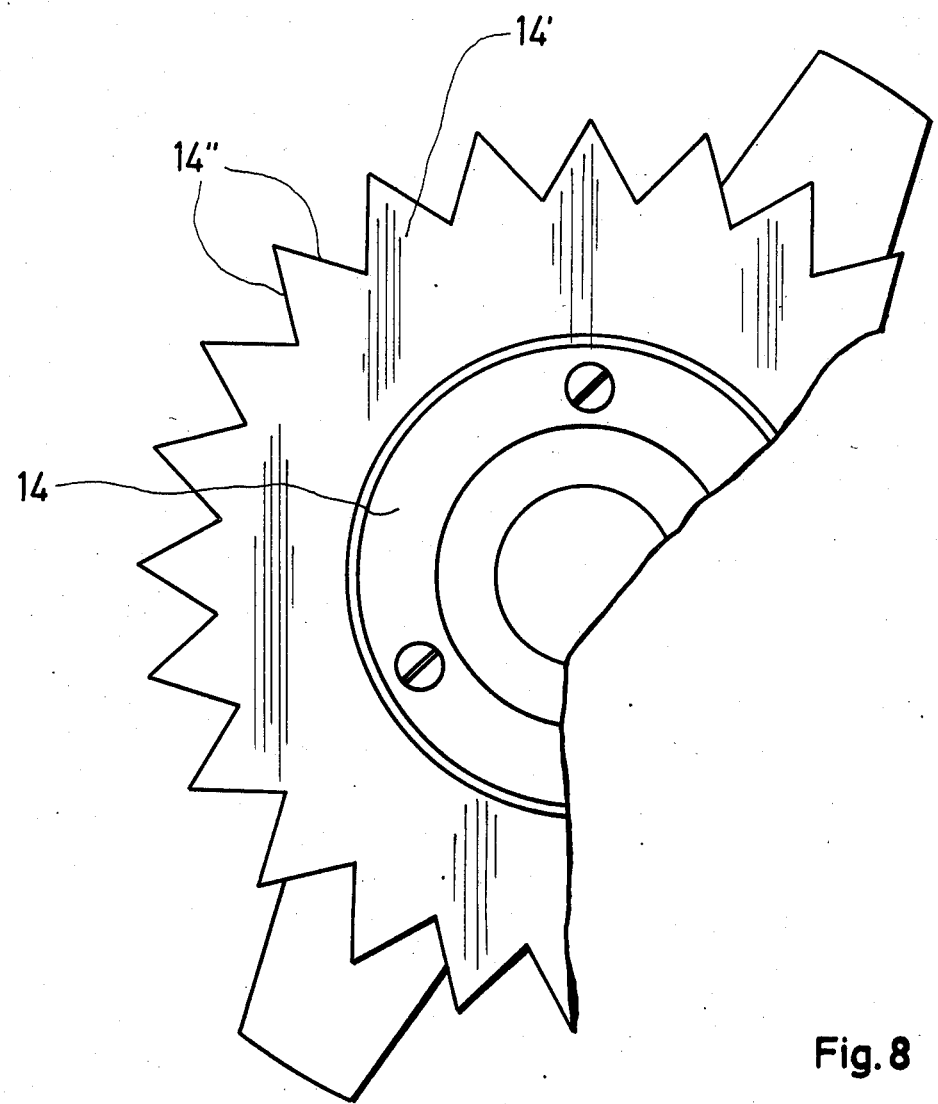

As shown in FIG. 7, cutting blade 7 is interposed between two thrust washers 12, 12' which have a friction lining 12a, 12a' at their outer surfaces facing the blade. Thrust washers 12, 12' are held together by at least one bolt 12b and a spring 12c which is preferably a plate spring. This spring 12c is interposed between the one thrust washer 12 facing toward guide tube 9 and a cover plate 14. The cover plate 14 is mounted on the free end 10 of guide tube 9 so as to be at a narrow spacing from cutting blade 7. Preferably, the cover plate 14 has a toothed edge 14' as shown in FIG. 8 which, during the cutting process, forms an abutment for supporting the vine shoots at the tooth surfaces 14".

Thrust washers 12, 12' and cutting blade 7 conjointly define a slip coupling 41 having a limit torque $\geq 0.2$ Nm. Higher torques cannot be transmitted to cutting blade 7. This torque limitation effectively prevents the vine pruning apparatus 1 with its light weight and ease of handling from being improperly used, for example, for cutting of other vegetation such as larger limbs. Such improper use could result in damage to the guide tube and the cutting blade. Accordingly, when cutting blade 7 meets stronger resistance, it is stopped, while thrust washers 12 continue to rotate. The torque can easily be adjusted by varying the tension of the plate spring with the effect that thrust washers 12 no longer impart rotary movement to the cutting blade 7 after a predetermined torque is exceeded. Slip coupling 41 prevents the apparatus from being utilized for cutting stronger plants or tall grasses. Such an application would require the use of more powerful drives and would cause a relatively high bending force to be applied to the light elongated guide tube and could cause it to become bent.

Circular cover plate 14 has an outer diameter which is preferably approximately 10 mm to 40 mm less than the diameter of the circle defined by the outer tips of rotary cutting blade 7. Moreover, unlike the rotary cutting knife, the cover plate 14 remains stationary during operation of the apparatus so that the cover plate always remains visible to the operator, even when cutting far removed shoots which can reach a height of 2.5 meters or more in modern vineyards. Accordingly, cover plate 14 greatly facilitates a precise cutting operation. The operator merely has to look at the disk periphery in order to find the exact spot at which the vine shoot has to be cut.

To power cutting blade 7, flexible shaft 6, 6' could be replaced by a pneumatic motor for which an air stream generated by the drive motor would be passed through guide tube 9. Additional possibilities include use of an electric motor drive equipped with a battery or generator drive.

To facilitate reaching remote shoots with cutting blade 7, guide tube 9 is elongated and forms a rigid unit with carrying handle 11 which can be twisted or turned as desired with respect to the flexible connecting tube 8. In order to position and hold guide tube 9 safely when cutting shoots which are difficult to reach, a grip handle 40 is provided at an ergonomically favorable distance from carrying handle 11. The guide tube 9 is held with the left hand at grip handle 40; whereas, the right hand grips carrying handle 11 comprising two half shells 11a (FIG. 4) while simultaneously operating the controls at the carrier handle.

All controls for activating apparatus 1 are located at carrier handle 11 for safe and easy operation of the apparatus. On the end of handle 11 facing drive motor 2, a piston-like cold starting unit 15 which a switch 15' adjustable in the direction of double arrow P' (FIG. 6) projects over a side wall of carrier handle 11. The handle 11 further contains a gas lever 17 and a gas lever latch 16 (FIGS. 3 to 6). Gas lever 17 has an arm 17' (FIGS. 4 and 5) which is diagonally and rearwardly inclined in the direction toward the drive part 6. In the rest position, arm 17' abuts against bolt 16' of gas lever latch 16. The latch 16 is displaceable in the direction of double arrow P (FIG. 4) and has a plate-like body 16" of triangular cross-sectional configuration. The bolt 16' projects outwardly beyond the plate-like body 16" as shown in FIG. 4.

By sliding the gas lever latch 16 downwardly, bolt 16' engages a corresponding latch opening 17" of gas lever 17 so that the latter then can be depressed to provide gas (FIG. 5). Carrying handle 11 also has a short circuit switch (not shown) for interrupting an electric ignition circuit.

Finally, carrying handle 11 contains a pivotally mounted two-armed locking lever 19 which has cam-like lugs 20, 21 on the ends of lever arms 19', 19", respectively (FIG. 3). Lug 20 forms a latch member, which in the locked position of locking lever 19, extends into a corresponding locking opening of end 9' of guide tube 9. The end 9' of guide tube 9 faces away from cutting blade 7 and is enclosed by carrier handle 11. Lug 21 is a press member having a profiled outer surface 22 which projects out beyond underside 24 of the handle 11 and faces in a direction away from grip support 23 of the handle 11. When press member 21 is depressed, locking lever 19 is rotated around its axis 25 in the clockwise direction thereby disengaging lug 20 from the locking opening of guide tube 9. A holding part 26 connects carrier handle 11 to guide tube 9 as shown in FIG. 3. If this connection is first released, guide tube 9 can be pulled out of carrier handle 11 and separated from coupling 27 and from tube 8 after locking lever 19 is depressed. Accordingly, an easy and quick disconnection is provided.

Holding part 26 is a clamping sleeve with a conical inner surface 26' and is threadably fastened onto a conically tapered and slotted end portion 28 of carrier handle 11. The releasable connection permits guide tube 9 to be replaced by another guide tube having a cutting head, flexible cutting line or the like so that the apparatus 1 can also be utilized as a brush cutter. Because tube 8 is loosely held in a corresponding grip opening of carrier handle 11, the carrier handle 11 with guide tube 9 can be rotated with respect to tube 8 having end piece 29. Rigid sleeve-like end piece 29 is mounted onto the end of tube 8' which faces away from drive motor 2.

Coupling 27 protrudes with tapered receiving parts 27', 27" into the end piece 29 and into opposite end portion 9' of guide tube 9. Tapered parts 27', 27" have respective insert openings 30 which are of rectangular configuration and are preferably square. The insert openings 30 accommodate respective ends 31 and 32 of output member 6 and drive member 6' of the flexible shaft 6, 6', which have corresponding cornered cross sections so that shaft members 6 and 6' are connected to rotate together.

In order to ensure that vine pruning apparatus 1 is started only when carried on the back of the operator and when carrier handle 11 is held with the right hand, a pull cord 33 of a starting device 34 (FIG. 2) is provided and located so that it can only be pulled at grip handle 42 downwardly in the direction of arrow P" (FIG. 2) with the left hand. This is a safeguard to prevent apparatus 1 from being started while on the ground and fully eliminates the risk of injury to the operator.

It is understood that the foregoing description is that of the preferred embodiments of the invention and that various changes and modifications may be made thereto without departing from the spirit and scope of the invention as defined in the appended claims.

What is claimed is:

1. Portable pruning apparatus for cutting shoots from vines in a vineyard, the apparatus comprising:
 a carrier adapted for mounting on the back of an operator;
 drive motor means mounted on said carrier;
 a handle for holding the apparatus when cutting vegetation therewith, said handle having a first end portion facing toward said drive motor means and a second end portion facing away from said drive motor means;
 a wand-like guide tube mounted to said handle unit at said second end portion thereof and having an outer end facing away from said second end portion;
 a connecting tube connected between said drive motor means and said first end portion;
 said guide tube and said handle conjointly defining a rigid unit freely rotatable about an axis through said guide tube with respect to said connecting tube;
 elongated and flexible torque transmitting means disposed in said guide tube and said connecting tube for transmitting torque from said drive motor means to said outer end of said guide tube;
 an outer shaft rotatably journalled in said outer end of said guide tube and connected to said torque transmitting means for rotation therewith;
 knife means mounted on said output shaft so as to permit rotation of said output shaft relative to said knife means;
 a slip coupling interposed between said output shaft and said knife means for transmitting rotational torque to said knife means up to a predetermined limit torque thereby restricting the cutting action of said knife means to the removal of said shoots and protecting the vine against damage by said knife means;
 a circular cover having a peripheral edge and a first diameter, said cover being interposed between said outer end and said knife means;
 said knife means having an outermost tip defining an outermost cutting circle of a second diameter;
 said second diameter being greater than said first diameter thereby defining a cutting ring directly adjacent said peripheral edge; and,
 said cover being a single cover and being fixedly attached to said output end so as to cause said peripheral edge adjacent said cutting ring to be clearly visible by the operator thereby facilitating the placement of said peripheral edge at the shoot to be cut from the vine;
 said drive motor means being an internal combustion engine; and,
 a safety arrangement for starting said engine, said starting arrangement including a starter mounted on said carrier; a starter cord extending from said starter; and, mounting means for guiding said starter cord so as to permit the latter to be pulled only by the operator with the left hand and only in the downward direction while the carrier is mounted on the back of the operator.

2. Portable pruning apparatus for cutting shoots from vines in a vineyard, the apparatus comprising:
 a carrier adapted for mounting on the back of an operator;
 drive motor means mounted on said carrier;
 a handle for holding the apparatus when cutting vegetation therewith, said handle having a first end portion facing toward said drive motor means and a second end portion facing away from said drive motor means;
 a wand-like guide tube mounted to said handle unit at said second end portion thereof and having an outer end facing away from said second end portion;
 a connecting tube connected between said drive motor means and said first end portion;
 said connecting tube being a flexible connecting tube for accommodating said output member and said drive member being disposed in said guide tube, said handle being configured as a clamshell housing surrounding and containing said coupling means, said apparatus further including a rigid end piece for holding said flexible connecting tube in said first end portion of said handle;
 elongated and flexible torque transmitting means disposed in said guide tube and said connecting tube for transmitting torque from said drive motor means to said outer end of said guide tube;
 said elongated and flexible torque transmitting means including: an output member rotatively driven by said drive motor means; a drive member for driving said knife means; and, coupling means mounted in said handle for interconnecting said output member and said drive member;
 an output shaft rotatably journalled in said outer end of said guide tube and connected to said torque transmitting means for rotation therewith;
 knife means mounted on said output shaft so as to permit rotation of said output shaft relative to said knife means;

a slip coupling interposed between said output shaft and said knife means for transmitting rotational torque to said knife means up to a predetermined limit torque thereby restricting the cutting action of said knife means to the removal of said shoots and protecting the vine against damage by said knife means;

a circular cover having a peripheral edge and a first diameter, said cover being interposed between said outer end and said knife means;

said knife means having an outermost tip defining an outermost cutting circle of a second diameter;

said second diameter being greater than said first diameter thereby defining a cutting ring directly adjacent said peripheral edge; and, said cover being a single cover and being fixedly attached to said output end so as to cause said peripheral edge adjacent said cutting ring to be clearly visible by the operator thereby facilitating the placement of said peripheral edge at the shoot to be cut from the vine.

3. Portable pruning apparatus for cutting vegetation such as vines and the like, the apparatus comprising:

a carrier adapted for mounting on the back of an operator;

drive motor means mounted on said carrier;

a handle for holding the apparatus when cutting vegetation therewith, said handle having a first end portion facing toward said drive motor means and a second end portion facing away from said drive motor means;

said guide tube and said handle conjointly defining a rigid unit;

rotatable joint means for connecting said connecting tube to said second end portion for permitting said rigid unit to be freely rotatable about an axis through said guide tube with respect to said connecting tube;

a wand-like guide tube mounted to said handle unit at said second end portion thereof and having an outer end facing away from said second end portion;

a connecting tube connected between said drive motor means and said first end portion;

knife means rotatably mounted on said outer end of said guide tube for rotation about a rotational axis;

elongated and flexible torque transmitting means disposed in said guide tube and said connecting tube for transmitting torque from said drive motor means to said knife means thereby imparting rotary movement to the latter;

a cover interposed between said outer end and said knife means, said knife means having an outer portion that projects outwardly beyond said cover;

a slip coupling for limiting said torque transmitted to said knife means; and, safety means for starting said apparatus when said carrier is mounted on the back of the operator, said safety means including: a starter mounted on said carrier; a starter cord extending from said starter; and, mounting means for guiding said starter cord so as to permit the latter to be pulled only by the operator with the left hand and only in the downward direction while the carrier is mounted on the back of the operator.

4. The portable pruning apparatus of claim 3 being a pruning apparatus for cutting shoots from vines in a vineyard, the apparatus further comprising:

an output shaft rotatably journalled in said outer end of said guide tube and connected to said torque transmitting means for rotataion therewith;

said knife means being mounted on said output shaft so as to permit rotation of said output shaft relative to said knife means;

said slip coupling being interposed between said output shaft and said knife means for transmitting rotational torque to said knife means up to a predetermined limit torque thereby restricting the cutting action of said knife means to the removal of said shoots and protecting the vine against damage by said knife means;

said cover being a circular cover having a peripheral edge and a first diameter;

said knife means having an outermost tip defining an outermost cutting circle of a second diameter;

said second diameter being greater than said first diameter thereby defining a cutting ring directly adjacent said peripheral edge; and, said cover being a single cover and being fixedly attached to said output end so as to cause said peripheral edge to said cutting ring to be clearly visible by the operator thereby facilitating the placement of said peripheral edge at the shoot to be cut from the vine.

* * * * *

UNITED STATES PATENT AND TRADEMARK OFFICE
CERTIFICATE OF CORRECTION

PATENT NO. : 4,696,108

DATED : September 29, 1987

INVENTOR(S) : Gerhard Zerrer et al

It is certified that error appears in the above-identified patent and that said Letters Patent is hereby corrected as shown below:

In column 1, line 13: delete "accomodating" and substitute -- accommodating -- therefor.

In column 1, line 33: after the word "vines", please add -- tend --.

In column 5, line 60: delete "outer", first occurrence should read -- output --.

In column 8, line 24: delete "rotataion" and substitute -- rotation -- therefor.

Signed and Sealed this

Fifteenth Day of March, 1988

Attest:

DONALD J. QUIGG

*Attesting Officer*  *Commissioner of Patents and Trademarks*